(12) United States Patent
Voon et al.

(10) Patent No.: US 6,891,720 B2
(45) Date of Patent: May 10, 2005

(54) ACCESS FOR A COMPUTER HOUSING

(75) Inventors: Sze-moey Voon, Santa Clara, CA (US); Thomas S. Neal, Cupertino, CA (US); Jacques L. Gagne, Los Gatos, CA (US); Ray Gradwohl, Saratoga, CA (US); Ricardo Penate, Pacifica, CA (US); Kenneth Wood, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 42 days.

(21) Appl. No.: 10/377,686

(22) Filed: Feb. 28, 2003

(65) Prior Publication Data

US 2004/0169997 A1 Sep. 2, 2004

(51) Int. Cl.$^7$ .................................................. G06F 1/16
(52) U.S. Cl. ...................... 361/683; 361/684; 361/685; 361/727; 312/332.1; 312/223.1; 16/254
(58) Field of Search ................................. 361/683–685, 361/724–727, 731–732; 312/223.1, 223.2, 332.1; 16/254, 260; 364/708.1; 220/341, 334, 337, 342

(56) References Cited

U.S. PATENT DOCUMENTS

| 5,557,499 | A | * | 9/1996 | Reiter et al. ................. 361/685 |
|---|---|---|---|---|
| 5,586,003 | A | * | 12/1996 | Schmitt et al. ............. 361/683 |
| 5,797,667 | A | * | 8/1998 | Wu .......................... 312/332.1 |
| 5,818,379 | A | * | 10/1998 | Kim ............................ 341/159 |
| 6,648,149 | B2 | * | 11/2003 | Robertson ..................... 211/26 |
| 2002/0027771 | A1 | | 3/2002 | Dong |
| 2004/0098734 | A1 | * | 5/2004 | Chen .......................... 720/607 |

FOREIGN PATENT DOCUMENTS

| EP | 1265246 | 11/2002 |
|---|---|---|
| JP | 2001236774 | 8/2001 |

* cited by examiner

Primary Examiner—Michael Datskovsky

(57) ABSTRACT

An access in a housing for a computer is disclosed. The access has a pivot mechanism coupled to the housing, and a door coupled to the pivot mechanism. The door rests flush against the computer housing when the access is not deployed. The door is configured to pivot in a downward direction for deployment of the access. An actuator is coupled to the door for actuating an ejection mechanism in a disk drive drawer. The actuator has a foam pad for depressing an eject button on a faceplate of the disk drive drawer.

20 Claims, 9 Drawing Sheets

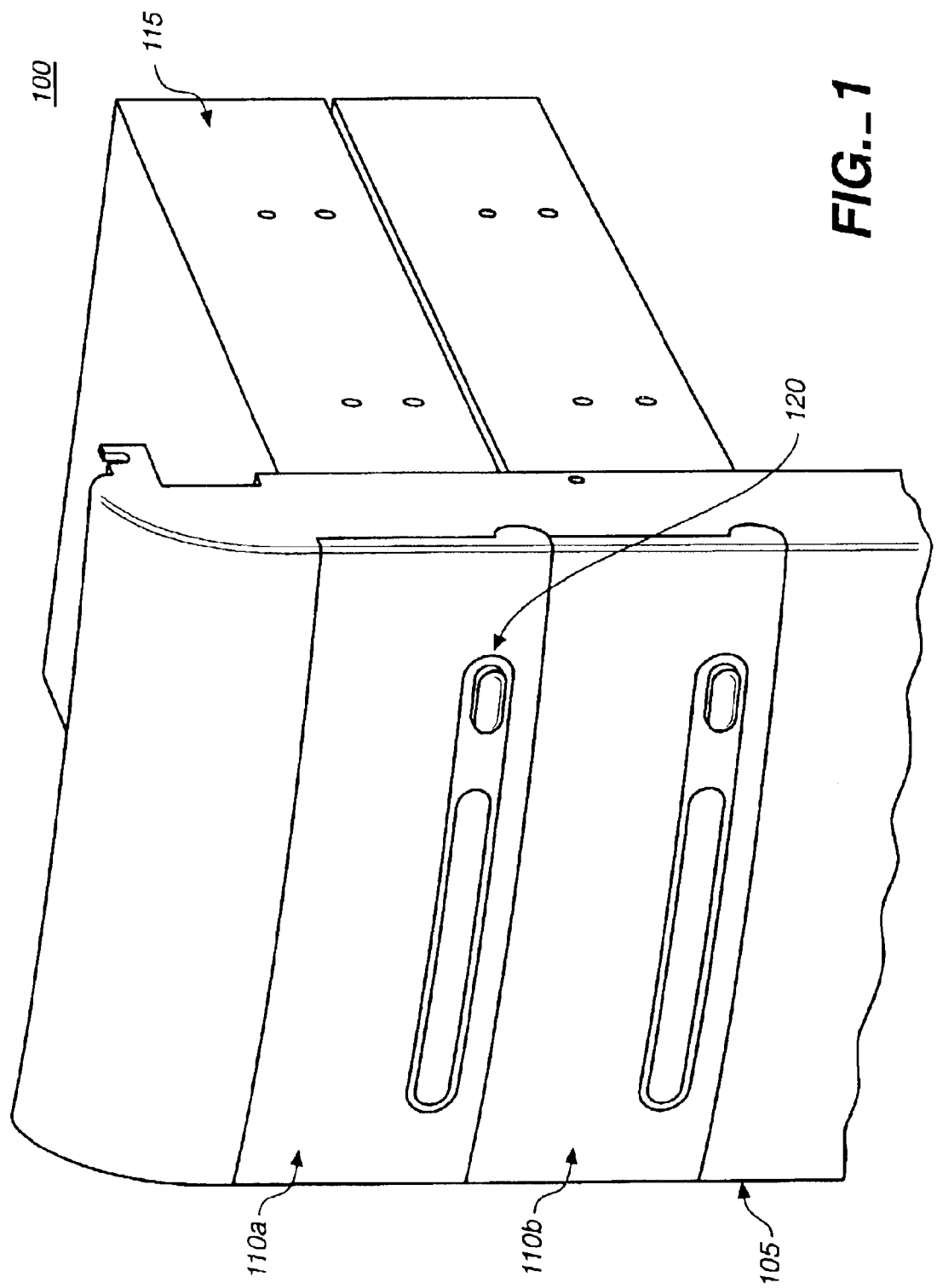
FIG._1

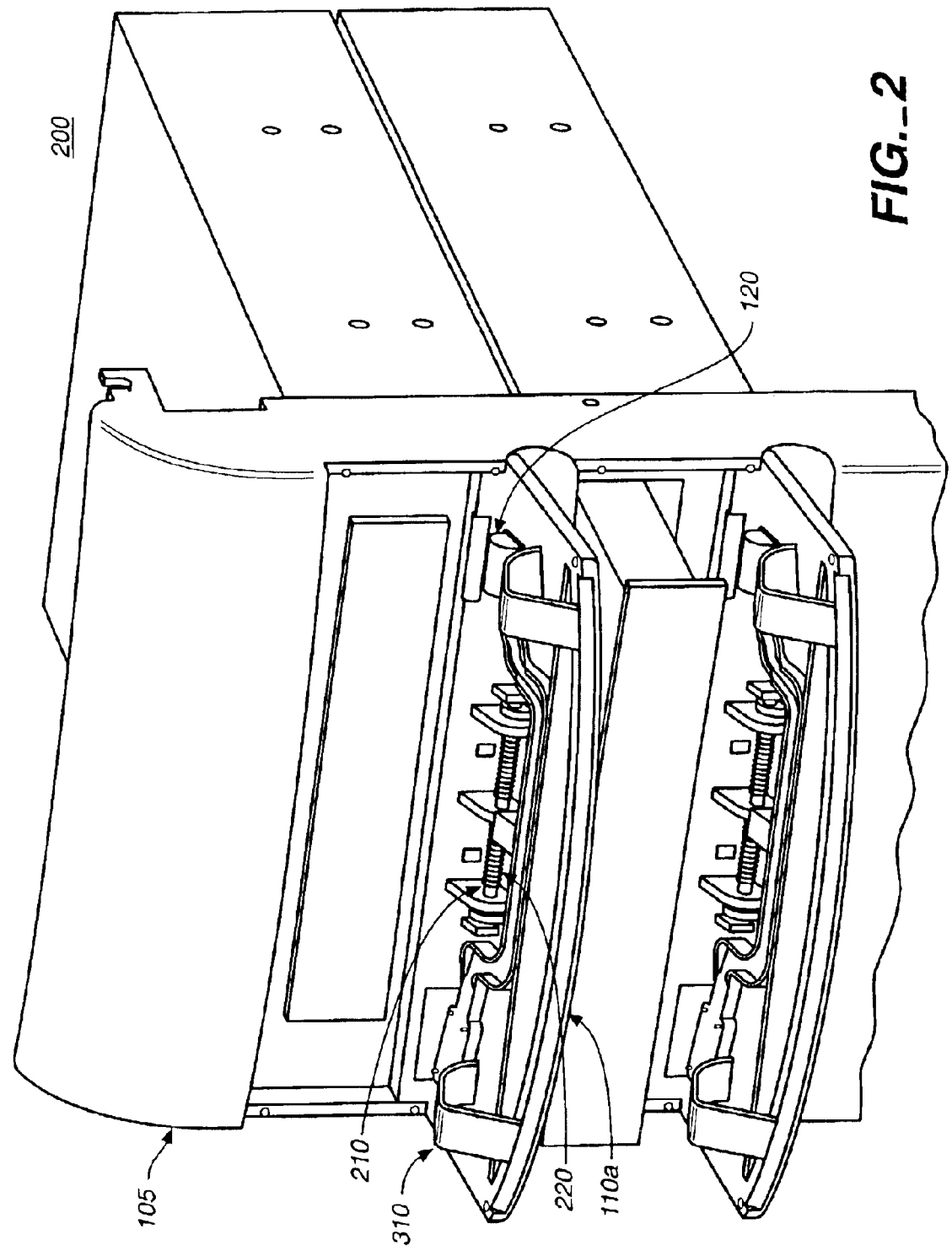
FIG._2

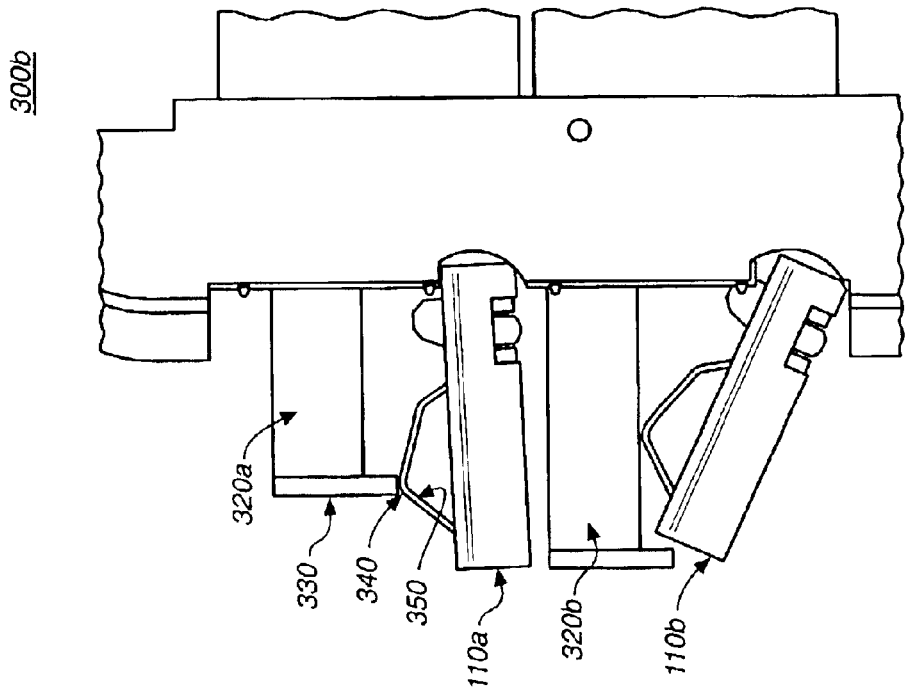
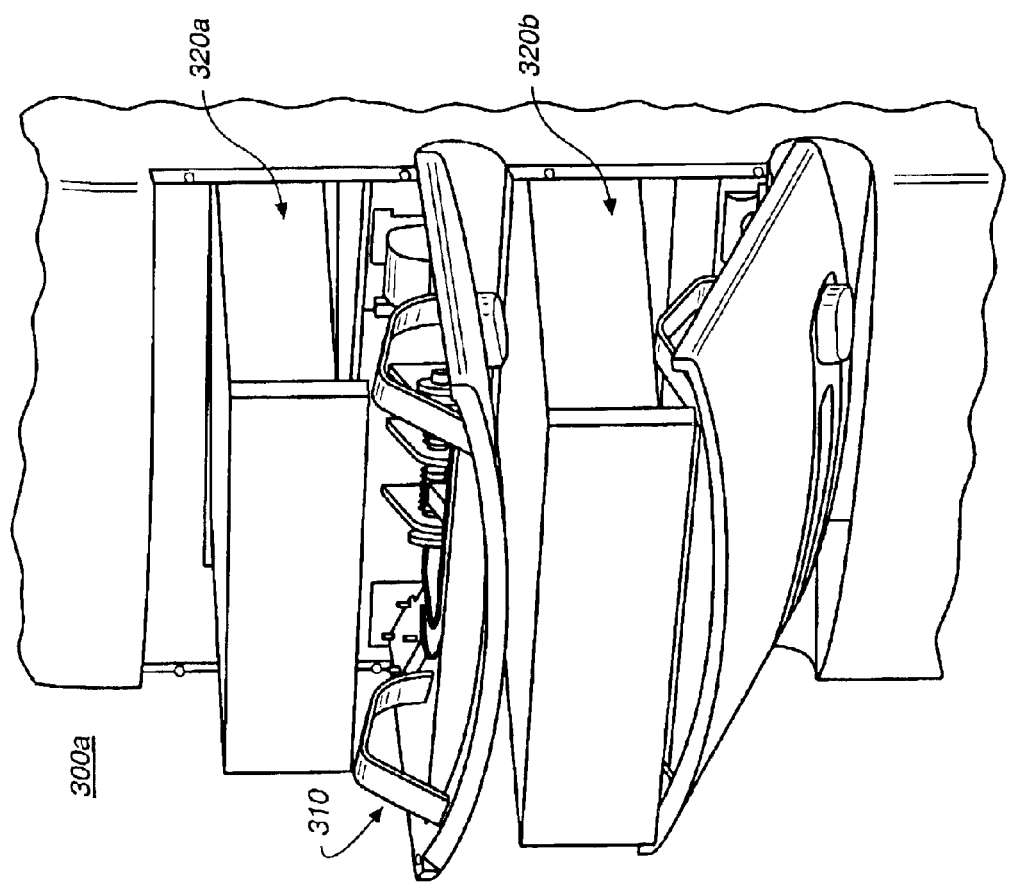
FIG._3A
FIG._3B

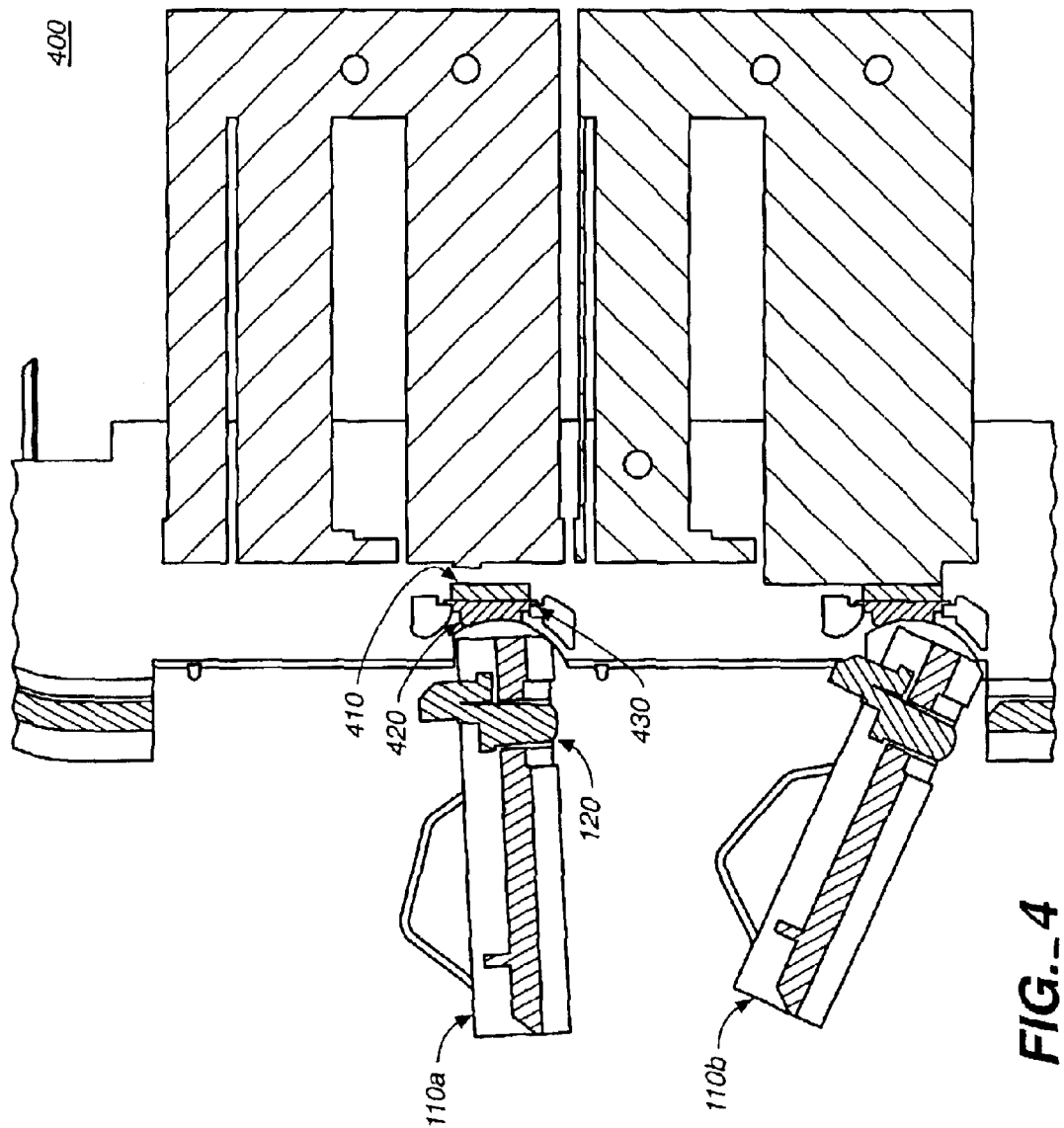
FIG._4

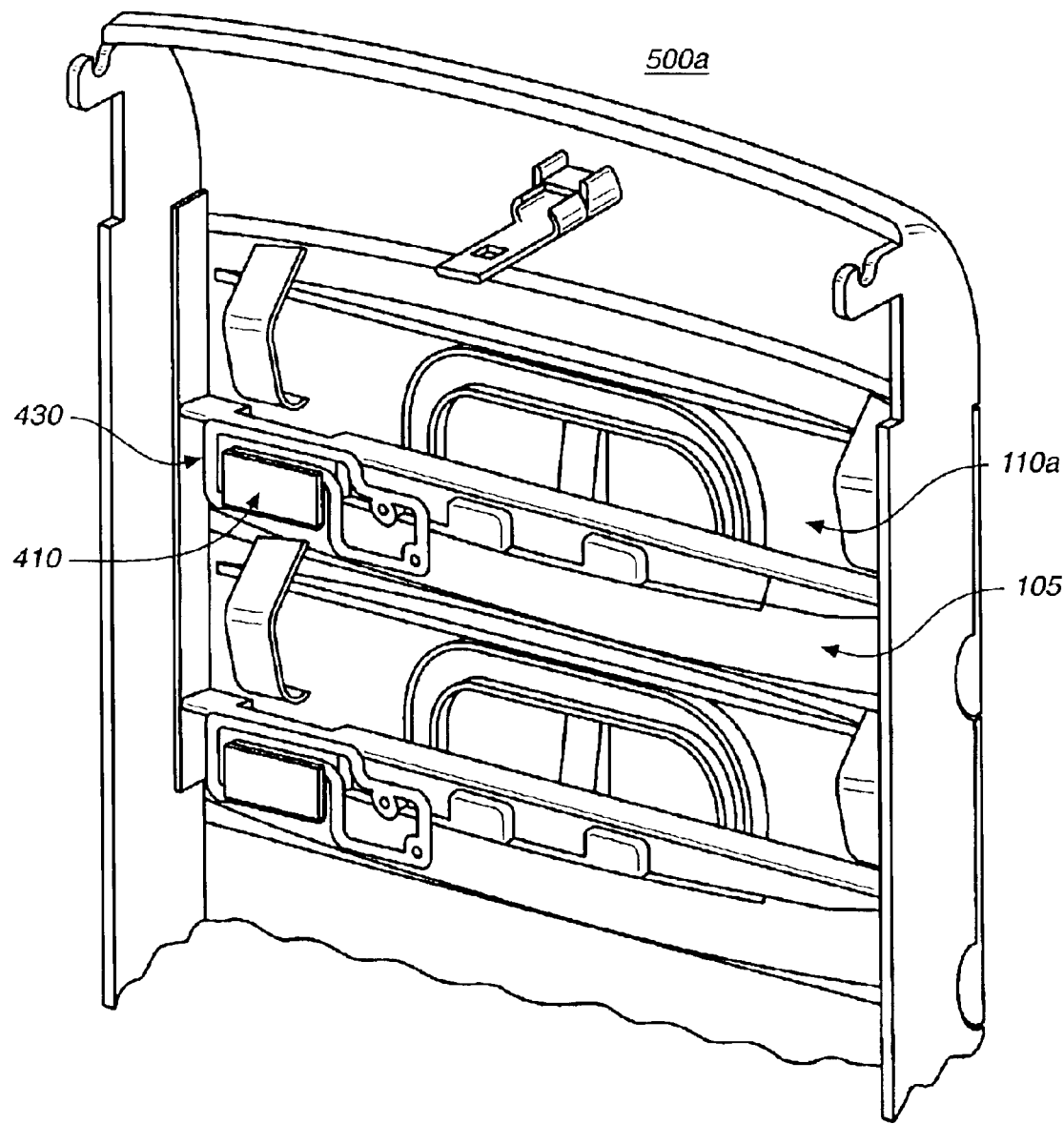
FIG._5A

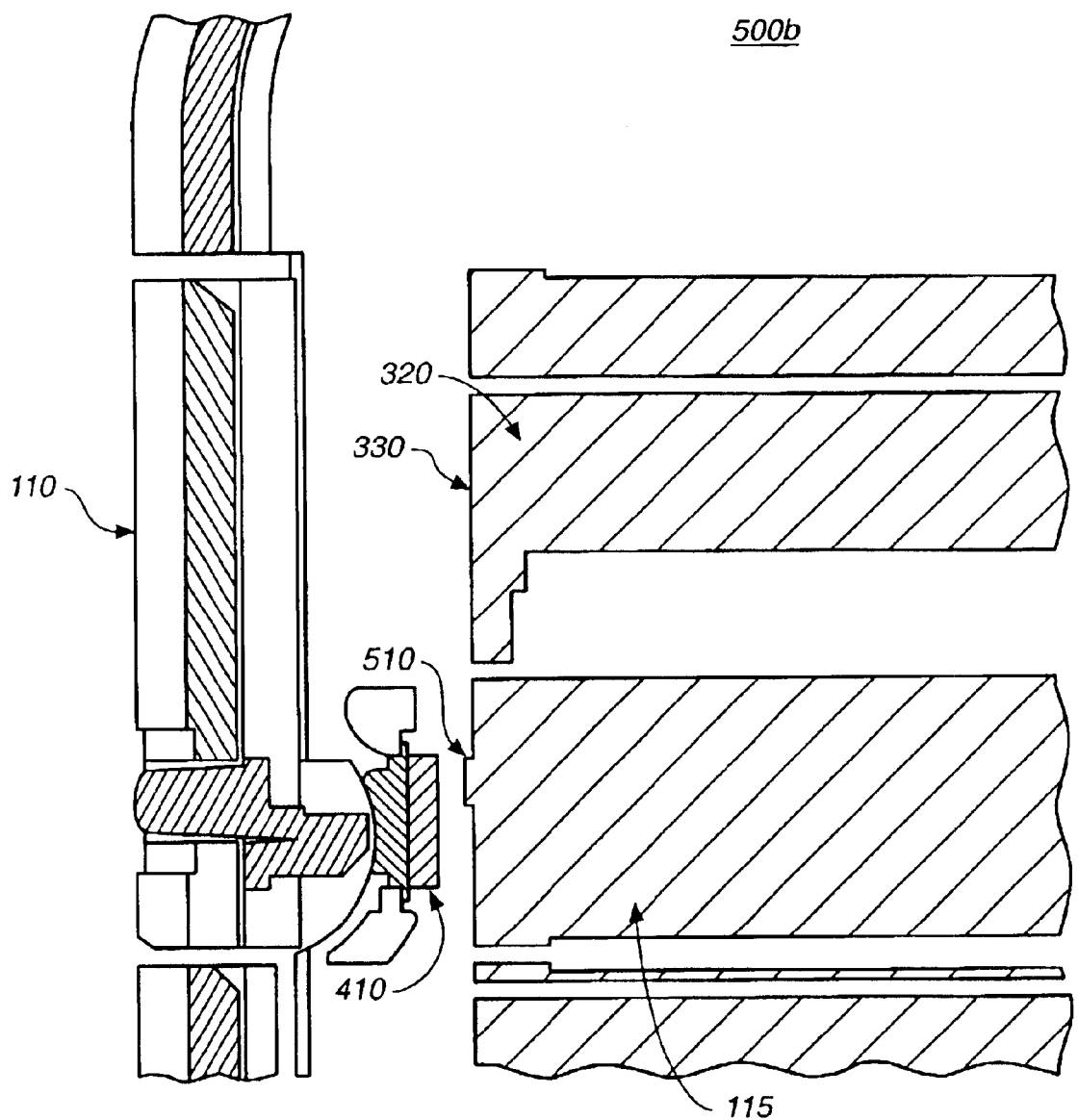
FIG._5B

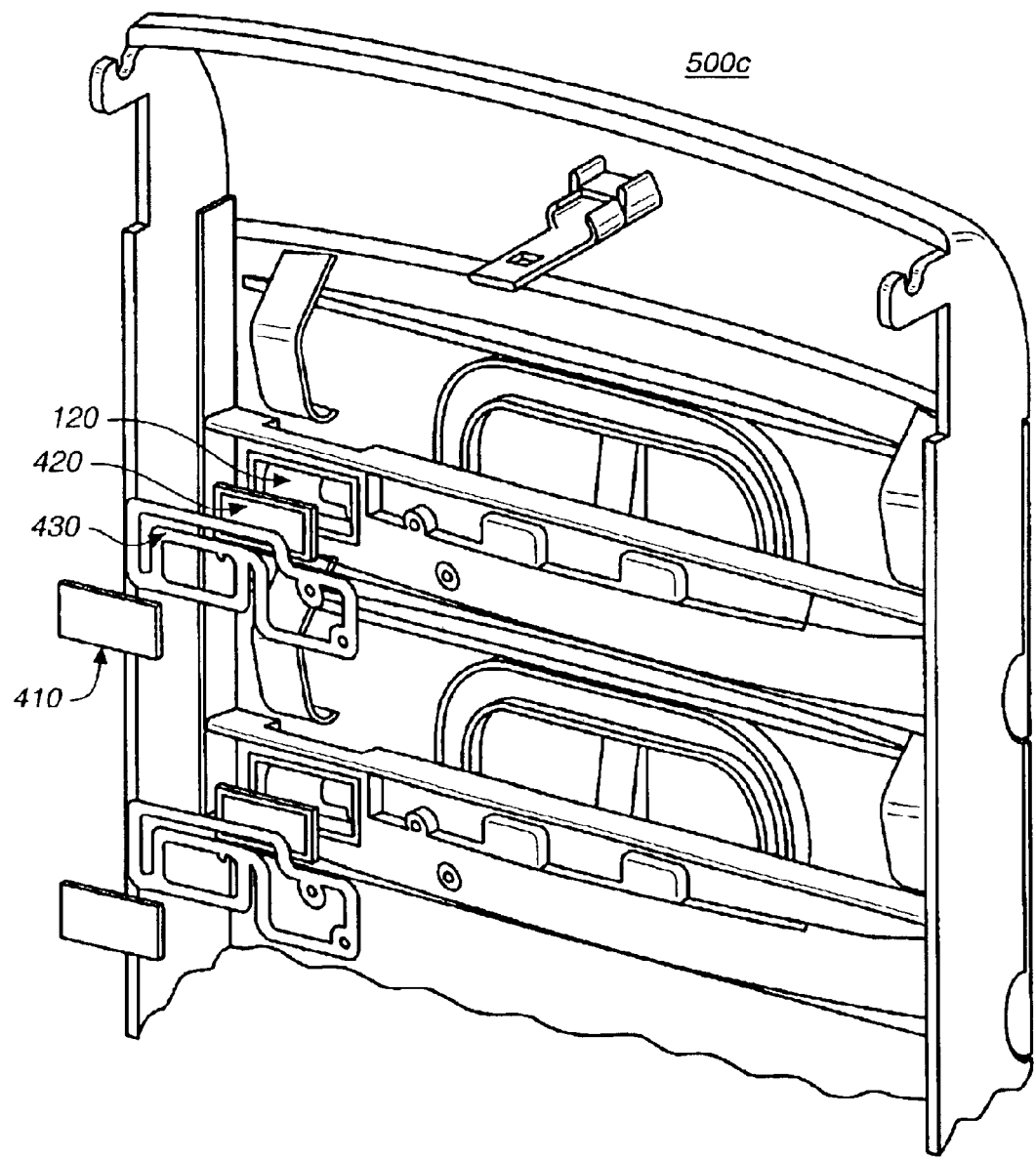
FIG._5C

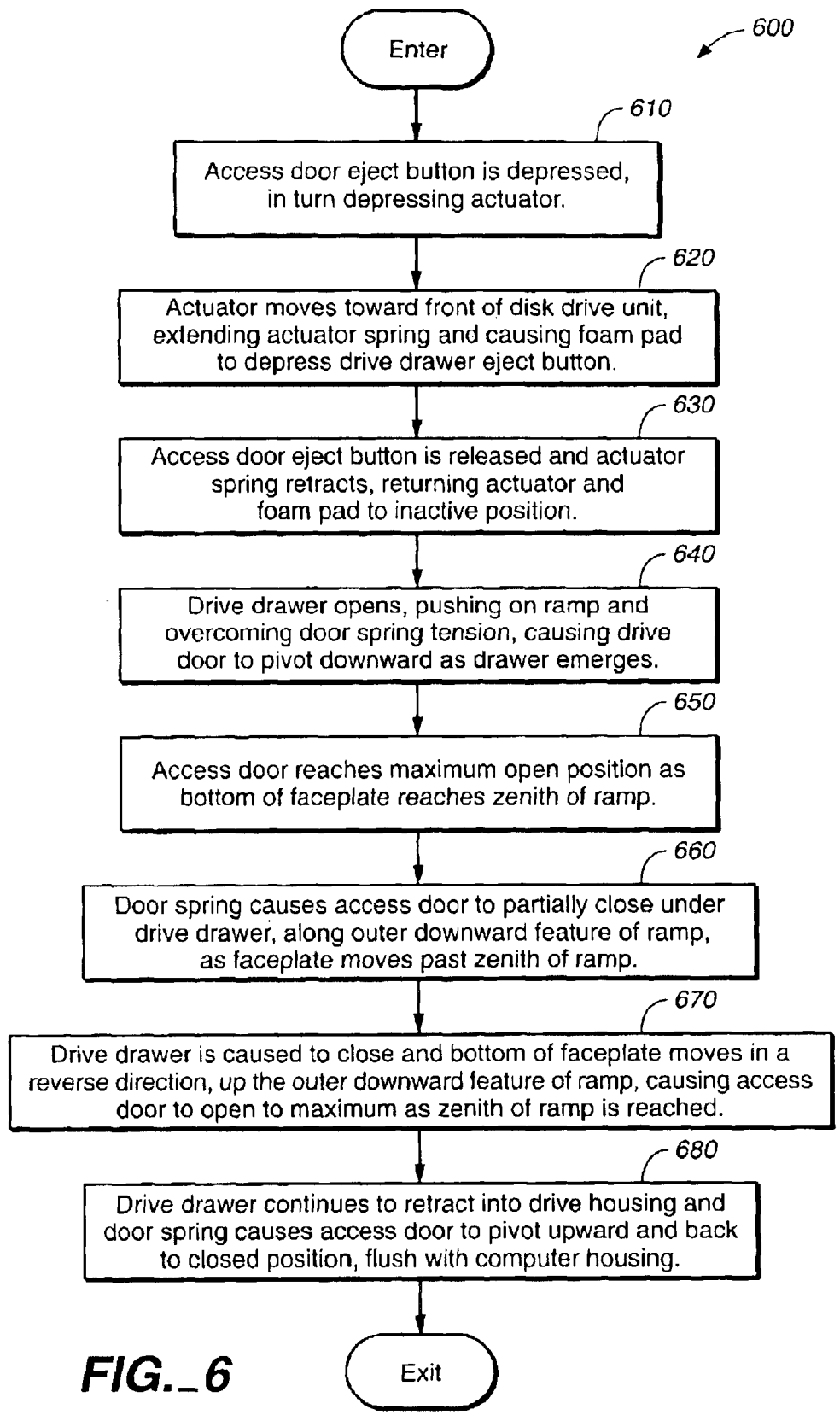
FIG._6

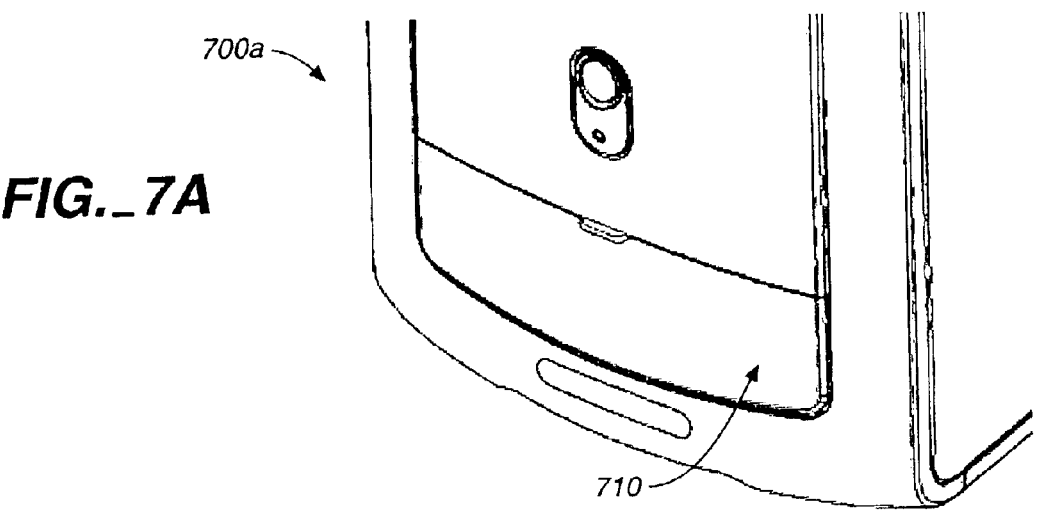
FIG._7A
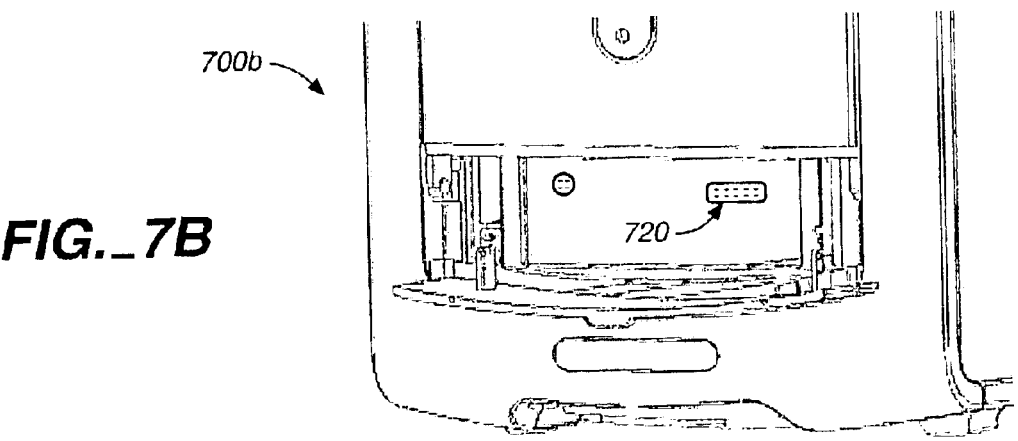
FIG._7B
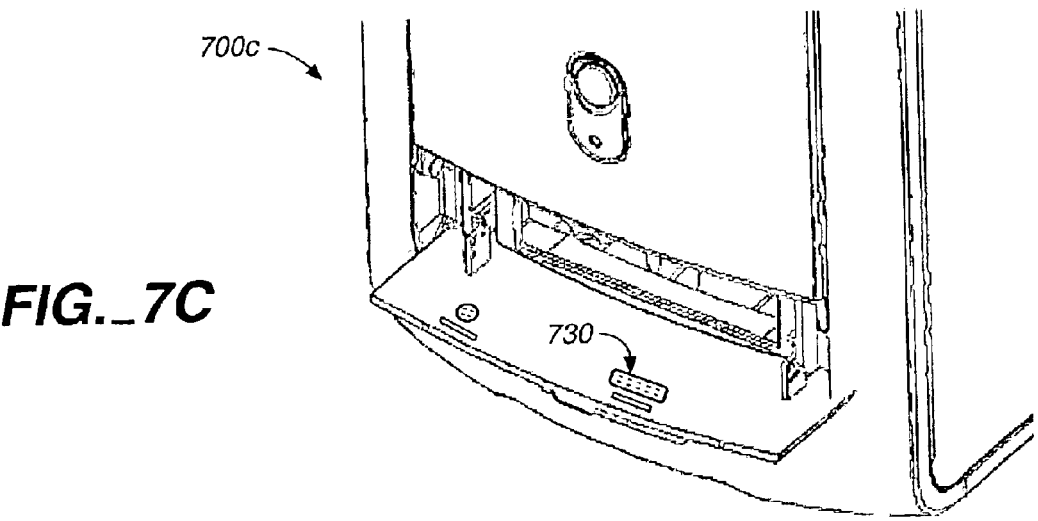
FIG._7C

0
ACCESS FOR A COMPUTER HOUSING

TECHNICAL FIELD

Embodiments of the present invention relate to the field of access doors in a computer housing. Specifically, embodiments of the present invention relate to access doors for connectors and optical drive units.

BACKGROUND

Personal computers are in wide use today and one popular style is the desktop computer that is mounted in a housing that occupies a relatively small space on a desktop. Some desktop computers are configured vertically, also known as a "tower" configuration. The tower configuration, which occupies desk space in addition to space for a monitor, also lends itself to being stored on the floor under a desk, thereby freeing up desk space. Some personal computers are configured horizontally, thereby occupying a larger amount of desk space than the tower configuration but allowing for a monitor to be located on its top.

One common feature of most personal computers, no matter what configuration, is that they have disk drives (e.g., optical disk drives) and they have connectors for connecting to networks and to various peripheral devices. The disk drives, such as CD and DVD drives, generally provide disk access via ejectable drawers that eject through an opening in the computer housing. A typical tower configuration may have one or more optical disk drive drawers that open through the front of the housing and a lift-up door behind which the various connectors are available.

Personal computers may often be found in industrial settings, such as test areas in manufacturing facilities. Such settings frequently are subjected to a large amount of airborne dust and/or other pollutants. Such pollutants can be detrimental to the mechanisms of disk drives, and can lead to drive failures.

Additionally, the manufacturing of faceplates for drive drawers that are customized to fit the form, material and color of a given computer housing is very expensive. There are "off-the-shelf" drive drawers available with standard colored faceplates that are substantially less expensive than custom faceplates.

Tower computers are often located on the floor underneath a user's desk. This location makes access the connectors for connecting peripheral equipment quite difficult, particularly with doors that must be lifted for access to the connectors. In addition, the lift-up doors block a users visual access to the connectors from a position above the access door.

SUMMARY

An access in a housing for a computer is disclosed. The access has a pivot mechanism coupled to the housing, and a door coupled to the pivot mechanism. The door rests flush against the computer housing when the access is not deployed. The door is configured to pivot in a downward direction for deployment of the access. An actuator is coupled to the door for actuating an ejection mechanism in a disk drive drawer. The actuator has a foam pad for depressing an eject button on a faceplate of the disk drive drawer.

BRIEF DESCRIPTION OF THE DRAWINGS

FIG. 1 is an upper right perspective view of a top portion of a computer housing with disk drives attached, illustrating disk drive access doors concealing the faceplates of the disk drive drawers, in accordance with one embodiment of the present invention.

FIG. 2 illustrates an interior view of a disk drive access door, according to one embodiment of the present invention.

FIG. 3A is a right front view of a computer housing illustrating the functioning of disk drive access doors, according to one embodiment of the present invention.

FIG. 3B is a right side view of a computer housing illustrating the functioning of disk drive access doors, according to one embodiment of the present invention.

FIG. 4 is a cutaway side view 400 of access doors, illustrating an actuator mechanism for an eject function of a disk drive, in accordance with one embodiment of the present invention.

FIG. 5A is an illustration of an actuator spring and foam pad, according to one embodiment of the present invention.

FIG. 5B is an illustration of an eject button on a disk drive faceplate in relation to an actuator mechanism, in accordance with one embodiment of the present invention.

FIG. 5C is an exploded view of an actuator mechanism, in accordance with one embodiment of the present invention.

FIG. 6 is a flow diagram of the steps in a process for opening and closing a disk drive access door, in accordance with one embodiment of the present invention.

FIG. 7A depicts an exterior right front view of a housing with a downward pivoting door for concealing connectors, in accordance with one embodiment of the present invention.

FIG. 7B illustrates an open view of a downward pivoting connector door revealing connectors within, according to one embodiment of the present invention.

FIG. 7C illustrates an open view of a downward pivoting connector door having labels showing locations of available connectors, according to one embodiment of the present invention.

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Embodiments of the present invention include downward pivoting access doors coupled to a computer housing that provide access to disk drives and connectors.

In one embodiment, an access door for a disk drive drawer rests flush against a computer housing when not in use and has a pivot mechanism that is configured to pivot downward as the disk drive drawer opens. An actuator coupled to the door actuates an ejection mechanism in the disk drive drawer when a foam pad coupled to the actuator depresses an eject button on a faceplate of the disk drive drawer.

Providing disk drive access doors as a feature of a computer housing has an advantage of providing a barrier to airborne pollutants that can be present in industrial environments such as manufacturing facilities and construction sites. In addition, having access doors as a feature of the computer housing provides an economic advantage of allowing standard disk drive units, having standard color, configuration and texture of faceplates, to be used, thereby avoiding the expense of customizing disk drive unit faceplates for a particular design of housing.

In addition, providing downward opening doors for concealing connectors allows readily visible access to the connectors. This is particularly useful in instances where the computer is stored on the floor. In addition, providing labels to indicate the location of available connectors further enables a user to quickly locate and install connections for peripheral accesses.

Certain portions of the detailed descriptions of embodiments of the invention, which follow, are presented in terms of processes and methods (e.g., process 600 of FIG. 6). Although specific steps are disclosed herein describing the operations of these processes and methods, such steps are exemplary. That is, embodiments of the present invention are well suited to performing various other steps or variations of the steps recited in the flowchart of the figure herein.

FIG. 1 is an upper right perspective view 100 of a top portion of a computer housing 105 with disk drives 115 attached, illustrating identical disk drive access doors 110a and 110b concealing faceplates of the disk drive drawers, in accordance with one embodiment. Although view 100 is of a tower configuration for a personal computer housing, it should be understood that the present invention can be implemented in a horizontal configuration or any other configuration that accommodates disk drives. Although computer housing 105 is shown in the present embodiment as having two identical disk drive access doors 110a and 110b, it should also be understood that there can be a single access door 110a or 110b, or there can be more than two disk drive access doors.

Still referring to FIG. 1, an eject button 120 is located on the front of each access door 100a and 100b. eject button 120 is coupled to an actuator (see FIG. 4) that actuates an ejection mechanism for opening a drawer in the disk drive unit 115 which, in turn, opens access door 110a, according to one embodiment of the present invention.

The providing of access doors 110a and 110b as a feature of computer housing 105 has an advantage of providing a barrier to airborne pollutants that are often present in industrial environments such as manufacturing facilities and construction sites. In addition, having access doors 110a and 110b as a feature of computer housing 105 provides an economic advantage of allowing standard disk drive units, having standard color, configuration and texture of faceplates, to be used, thereby avoiding the expense of customizing disk drive unit faceplates for a particular design of housing.

FIG. 2 illustrates an interior view 200 of a disk drive access door 110a, according to one embodiment. The back side of eject button 120 is shown. An actuator 420 is located on housing 105 beneath the opening for ejecting a disk drive drawer. When access door 110a is in a closed position, eject button 120 can align with actuator 420 so that pressing eject button 120 in turn presses actuator 420.

Hinge pin 210 functions to couple access door 110a to housing 105, and it also functions as an axis for door spring 220. Door spring 220 is configured so that its tension maintains access door 110a in a closed position until overcome by a force pressing outward from the inside of access door 110a. Ramp 310 and its compliment furnish a platform on which the faceplate of a disk drive drawer ejecting from its housing can press to open access door 110a.

Although ramp 310 is shown to be located on one side of the interior of door 110a, with a complimentary ramp on the opposite side, it should be understood that a single ramp, or any number of ramps may be employed and positioned as convenient.

FIG. 3A is a right front view 300a of computer housing 105 illustrating the functioning of disk drive access doors 110a and 110b, according to one embodiment. FIG. 3B is a right side view 300b of computer housing 105 illustrating the functioning of disk drive access doors 110a and 110b, according to one embodiment. FIG. 3A will be discussed in concert with 3B for describing an access door functionality. In both figures, the access doors are shown opening as disk drive drawers 320a and 320b open.

Disk drive drawer 320a is shown partially open as it emerges from its housing. Disk drive drawer 320b is depicted in a fully open position. As disk drive drawer opens, faceplate 330 presses on ramp 310 of access door 11a, overcoming the tension of door spring 220 (as shown in FIG. 2), and causing access door 110a to pivot out and downward. As the disk drive drawer 320a continues to open, the lower edge of faceplate moves along ramp 31, causing access door 110a to continue pivoting open until the lower edge of faceplate 330 reaches the zenith 340 of ramp 310.

As shown by access door 110b and disk drive drawer 320b of FIG. 3B, in accordance with one embodiment, as disk drive drawer 320b continues to open, the lower edge of faceplate 340 moves past zenith 340 and continues pressing against an outer downward feature 350 of ramp 310. The tension on door spring 220 causes access door 110b to begin to pivot upward under disk drive drawer 320b. Thus, access door 310a may open to a maximum position when disk drawer 320a is at a partially open position and access door 110b may be open at a lesser position when disk drawer 320a is fully open.

Referring now to FIG. 4, a cutaway side view 400 of access doors 110a and 110b is shown, illustrating an actuator mechanism for an eject function of a disk drive, in accordance with one embodiment. Access door eject button 120 may be seen penetrating the thickness of access door 110a and 110b and emerging from both the front and the back sides of access door 110a and 110b. Thus, pressing on access door eject button 120 from one side causes it to further emerge from the other side.

Also illustrated on FIG. 4 are actuator 420, actuator spring 430 and foam pad 410 coupled to actuator 420 and to housing 105. Foam pad 410 can be coupled to actuator 420 by one of many adhesive substances suitable for the environment or be any other coupling method deemed appropriate.

FIG. 4 can be further understood when viewed in concert with FIGS. 5A, 5B and 5C, and with flow diagram 600 of FIG. 6. FIG. 5A is a rear view 500a of housing 105, illustrating an actuator spring 430 and foam pad 410, according to one embodiment. FIG. 5B is a cutaway view 500b illustrating a disk drive drawer eject button 510, located on disk drive unit 115 below faceplate 330, in relation to foam pad 410 of the actuator mechanism, in accordance with one embodiment. FIG. 5C is an exploded view 500c of an actuator mechanism, illustrating foam pad 410, actuator spring 430, actuator 420 and the back side of access door eject button 120, in accordance with one embodiment.

FIG. 6 is a flow diagram 600 of the steps in a process for opening and closing a disk drive access door, in accordance with one embodiment of the present invention. Process 600 is entered at step 610 when the eject button 120 in access door 110a is depressed, in turn depressing actuator 420, located on housing 105, in line with access door eject button 120 and the drive drawer eject button 510 of drive unit 115.

As shown in step 620 of FIG. 6, actuator 420 moves toward the front of drive unit 115, extending actuator spring 430, until foam pad 410 contacts and depresses drive drawer eject button 510, located on disk drive unit 115, thus activating the eject mechanism of disk drive unit 115, in accordance with one embodiment. It should be understood that disk drive unit 115 can be any standard disk drive unit having dimensions appropriate for the personal computer in which it is designated to reside and having an eject button 510 that aligns with actuator 420 and foam pad 410. The eject mechanism can be any eject mechanism that accompanies drive unit 115 and causes a disk drive drawer to emerge.

As illustrated by step 630, in one embodiment, as access door eject button 120 is released, actuator spring 430 retracts, returning actuator 420 and foam pad 410 to their inactive position. The disk drive eject mechanism, having been engaged, begins ejecting disk drive drawer 320.

At step 640 of process 600, according to one embodiment, upon opening, drive drawer 320 pushes against the ramp (e.g., ramp 310 of FIGS. 3A and 3B) of access door 110, overcoming tension of door spring 220, and causing access door 110 to pivot downward as drive drawer faceplate 330 moves along ramp 310.

As process 600 moves to step 650, access door 110 reaches a maximum open position when the bottom edge of faceplate 330 reaches the zenith (e.g., 340 of FIG. 3B) of ramp 310. At this point, according to one embodiment, the disk drive drawer 320 is not completely open. As disk drive drawer continues to open, step 660 is entered.

At step 660, as faceplate 330 continues to open past zenith 340 of ramp 310, along outer downward feature 350 of ramp310, door spring 220 causes access drive door 110 to partially close beneath disk drive drawer 320 (see FIGS. 3A and 3B).

Step 670 illustrates the access door function at the beginning of a door close phase. When the disk drive drawer 320 is caused to close, either via a software command, by a user pressing on the faceplate 330 or by whatever method is used to close the drive unit, the bottom of faceplate 330 begins to move in a reverse direction, toward the drive unit housing 115. In moving thusly, faceplate 330 traverses the outer downward feature 350 of ramp 310 toward zenith 340, causing access door 110 to pivot downward, opening to the maximum position, in accordance with one embodiment.

As the process moves to step 680, disk drive drawer 320 continues to retract into drive unit housing 115, door spring 220 causes access door 110 to pivot upward. As disk drive drawer 320 completes retracting and assumes a closed position in disk drive housing 115, access door 110 assumes a closed position, flush with computer housing 105 and process 600 is exited.

FIG. 7A depicts an exterior right front view 700a of a computer housing with a downward-pivoting door 710 for concealing connectors, in accordance with one embodiment. Although view 700 is of a tower configuration for a personal computer housing, it should be understood that the present invention can be implemented in a horizontal configuration or any other configuration that accommodates connectors.

Tower computers are often located on the floor underneath a user's desk which can make access the connectors for connecting peripheral equipment quite difficult. Having a downward opening connector door 710 on the front of the computer housing 105 can provide ready visual and mechanical access to connectors within. Connector door 710 rests flush with computer housing 105 when closed, and can be opened by pulling out on tab 705.

FIG. 7B illustrates an open view 700b of downward-pivoting connector door 710 revealing connector 720 within, according to one embodiment. Connector 730 can be any of a variety of connectors used to connect a computer to peripheral devices or access peripheral services. Such devices can include, but are not limited to, for instance, USB connectors, Fire wire connectors, fiber optic connectors, coaxial connectors, or network connectors. Connector door 710 pivots downward on a plurality of hinges 715, and remains in an open position until closed by a user.

FIG. 7C illustrates an open view 700c of downward-pivoting connector door 710 having labels 730 showing locations of available connectors such as connector 720, according to one embodiment. The labels 730 provide an advantage of providing a user a pictorial diagram of the location of connectors to facilitate a connection process. The labels 730 may be a variety of representations, for example, a pictorial image of a connector, a connector name, a standard symbol for a connector or any other representation that would portray the available connectors. A plurality of snap devices 740 can function to maintain connector door 710 in a closed position when not in use.

An embodiment of the present invention, a method and apparatus providing access in a computer housing, is thus described. While the present invention has been described in particular embodiments, it should be appreciated that the present invention should not be construed as limited by such embodiments, but rather construed according to the following claims and their equivalents.

What is claimed is:

1. In a housing for a computer, an access comprising:
   a pivot mechanism coupled to said housing;
   a door coupled to said pivot mechanism, wherein said door rests flush against said computer housing when said access is not deployed and wherein said door is configured to pivot in a downward direction for deployment of said access; and
   an actuator coupled to said door for actuating an ejection mechanism in a disk drive drawer within said housing, wherein said actuator comprises a foam pad for depressing a first eject button on a faceplate of said disk drive drawer.

2. The access as recited in claim 1, wherein said door covers said disk drive drawer.

3. The access as recited in claim 2, wherein said door comprises a second eject button for extending an actuator spring and actuating said actuator.

4. The access as recited in claim 3 wherein releasing said second eject button causes an actuator spring to retract, deactivating said actuator.

5. The access as recited in claim 1 further comprising a ramp coupled to said door.

6. The access as recited in claim 5 wherein said ramp comprises a zenith and an outer downward feature.

7. The access as recited in claim 1, wherein said pivot mechanism comprises:
   a plurality of hinges coupled to a lower portion of said door;

a hinge pin coupled to said plurality of hinges and said housing; and a door spring coupled to said hinge pin for maintaining said door in a closed position when said access is not deployed.

8. The access as recited in claim 7 wherein said door is caused to pivot downward on said plurality of hinges as said disk drive drawer emerges from a disk drive housing.

9. The access as recited in claim 8, wherein said door spring functions to cause said door to pivot upward when said disk drive drawer retracts into said disk drive housing.

10. In a housing for a computer, a door providing access to a drive unit comprising:

a plurality of hinges coupled to a lower portion of said door and said housing, wherein said plurality of hinges are configured to allow said door to pivot in a downward direction;

a hinge pin coupled to said plurality of hinges and said housing;

a door spring coupled to said hinge pin for maintaining said door in a closed position when said access is not deployed;

an eject button coupled to said door for causing the opening of said drive unit; and a ramp coupled to said door for causing said door to pivot in a downward direction in response to said opening of said drive unit.

11. The door as recited in claim 10, wherein depressing said eject button in turn depresses an actuator for actuating an eject mechanism of said drive unit.

12. The door as recited in claim 11, wherein said actuator is coupled to an actuator spring for returning said actuator to a deactivated position following an actuation.

13. The door as recited in claim 12, wherein a foam pad is coupled to said actuator.

14. The door as recited in claim 10 wherein said door spring causes said door to automatically close when said drive unit retracts to a closed position.

15. The door as recited in claim 10 wherein said door opens in response to a leading bottom edge of said drive unit opening and pushing outward and downward on said ramp.

16. The door as recited in claim 15 wherein said door attains a maximum open position when said leading bottom edge reaches a zenith of said ramp.

17. A method for opening an access door in a computer housing, comprising:

activating an actuator, wherein said actuating comprises depressing an access door eject button;

entering an eject mode, wherein said entering comprises depressing a drive drawer eject button with a foam pad, said foam pad coupled to said actuator;

forcing said access door to to pivot downward, by pressing on a ramp feature of said access door with said disk drive drawer faceplate, wherein said disk drive drawer faceplate presses on said ramp until a zenith of said ramp is reached by said disk drive drawer faceplate; and causing said access door to pivot upward under tension of a door spring as said disk drive drawer faceplate moves past said zenith of said ramp and onto an outer downward feature of said ramp, wherein said causing comprises continuing to press on said ramp feature with said disk drive drawer faceplate.

18. The method of claim 17 wherein, upon said disk drive drawer being caused to close, said access door pivots downward as said disk drive drawer faceplate begins to move toward said zenith along said outer downward feature of said ramp.

19. The method of claim 18 wherein, under tension of said door spring, said access door pivots upward and into a closed position as said disk drive drawer faceplate moves past said zenith along said ramp and closes into a drive housing.

20. The method of claim 17 wherein said access door is in a maximum open position when said disk drive drawer faceplate contacts said zenith of said ramp.

\* \* \* \* \*